(12) United States Patent
Shimada et al.

(10) Patent No.: US 9,073,428 B2
(45) Date of Patent: Jul. 7, 2015

(54) SUPPORTING STRUCTURE FOR VEHICLE CONTROL UNIT

(75) Inventors: Masahiro Shimada, Utsunomiya (JP);
Tomohiro Fukazu, Utsunomiya (JP);
Takafumi Nakaune, Shioya-gun (JP);
Tsuyoshi Kobayashi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/825,538

(22) PCT Filed: Jul. 18, 2012

(86) PCT No.: PCT/JP2012/068190
§ 371 (c)(1),
(2), (4) Date: Mar. 21, 2013

(87) PCT Pub. No.: WO2013/012001
PCT Pub. Date: Jan. 24, 2013

(65) Prior Publication Data
US 2014/0117198 A1 May 1, 2014

(30) Foreign Application Priority Data
Jul. 20, 2011 (JP) .................. 2011-159355

(51) Int. Cl.
*F16M 13/00* (2006.01)
*B60K 26/00* (2006.01)
*B60K 1/00* (2006.01)

(52) U.S. Cl.
CPC . *B60K 26/00* (2013.01); *B60K 1/00* (2013.01); *B60Y 2306/01* (2013.01)

(58) Field of Classification Search
USPC ............. 248/560, 562, 634, 635; 307/10.1
See application file for complete search history.

(56) References Cited

U.S. PATENT DOCUMENTS

| | | | |
|---|---|---|---|
| 5,876,013 A * | 3/1999 | Ott | 248/674 |
| 6,390,223 B1 * | 5/2002 | Savage et al. | 180/300 |
| 7,730,867 B2 * | 6/2010 | Fonville et al. | 123/195 A |
| 8,590,662 B2 * | 11/2013 | Lee et al. | 180/312 |
| 2009/0205605 A1 * | 8/2009 | Fonville et al. | 123/195 A |

(Continued)

FOREIGN PATENT DOCUMENTS

| | | |
|---|---|---|
| CN | 201174394 Y | 12/2008 |
| JP | 09-272459 A | 10/1997 |

(Continued)

OTHER PUBLICATIONS

Internal Seaarch Report, PCT/JP2012/068190 mailed date Aug. 28, 2012.

(Continued)

*Primary Examiner* — Steven Marsh
(74) *Attorney, Agent, or Firm* — Westerman, Hattori, Daniels & Adrian, LLP

(57) ABSTRACT

An inner side edge part of a PCU supporting frame is arranged at a rear-downward angle; a rear supporting bracket that connects a rear edge part of the supporting frame with a dashboard upper is arranged at a rear-upward angle; the frame main body and the PCU are pressed diagonally down-backward when a load input is received on the supporting frame from the vehicle front side; and with the rear supporting bracket being rotationally displaced by this pressing, the supporting frame and the PCU are displaced diagonally downbackward.

4 Claims, 8 Drawing Sheets

(56) References Cited

U.S. PATENT DOCUMENTS

2009/0250275 A1  10/2009  Yoshida
2012/0112537 A1  5/2012  Fukazu et al.

FOREIGN PATENT DOCUMENTS

| | | |
|---|---|---|
| JP | 2003-146242 A | 5/2003 |
| JP | 2010-173568 A | 8/2010 |
| JP | 2010-173569 A | 8/2010 |
| JP | 2012-101569 A | 5/2012 |
| RU | 2371329 C1 | 10/2009 |
| SU | 1667631 A3 | 7/1991 |

OTHER PUBLICATIONS

Office Action dated Feb. 4, 2015, issued in corresponding Chinese Application No. 201280002348.3, w/partial English translation. (7 pages).

Decision to Grant a Patent dated Apr. 24, 2015, issued in corresponding Russian Patent Application No. 2013-123015, w/English translation (10 pages).

* cited by examiner

SUPPORTING STRUCTURE FOR VEHICLE CONTROL UNIT

CROSS-REFERENCE TO RELATED APPLICATIONS

This application is a National Stage entry of International Application PCT/JP2012/068190 filed Jul. 18, 2012, which claims priority to Japanese Application No. 2011-159355, filed Jul. 20, 2011, the disclosure of these prior applications are hereby incorporated in their entirety by reference.

TECHNICAL FIELD

The present invention relates to a supporting structure for a control unit of a vehicle which has an electric motor for traveling.

Priority is claimed on Japanese Patent Application No. 2011-159355, filed Jul. 20, 2011, the contents of which are incorporated herein by reference.

BACKGROUND ART

Heretofore, in a supporting structure for a control unit of a vehicle that is provided with, in an engine compartment at the front part of a vehicle body, an electric motor serving as a power source, and a power control unit that controls driving of the electric motor, in order to efficiently absorb collision energy with the vehicle front part at the time of a frontal collision, the power control unit of a particularly high level of rigidity is horizontally moved by force of impact (for example, refer to Patent Document 1).

CITATION LIST

Patent Document

[Patent Document 1] Japanese Unexamined Patent Application, First Publication No. H09-272459

SUMMARY OF INVENTION

Technical Problem

Incidentally, since a power control unit is an expensive unit, it is normally designed with increased strength to prevent damage thereto as much as possible. Therefore, there is a problem in that the level of freedom in designing is lowered due to the increased weight of the power control unit itself.

Consequently, an aspect of the present invention has an object of providing a supporting structure for a vehicle control unit that reduces load input at the time of a frontal collision in order to reduce the weight of the power control unit.

Solution to Problem

The present invention employs the following aspects in order to solve the above problem and achieve the object. That is to say, (1) An aspect of the present invention is a supporting structure for a control unit of a vehicle that is provided with, in an engine compartment at a front part of a vehicle body, an electric motor serving as a power source, a power control unit that controls driving of the electric motor, and a supporting frame that supports the power control unit on the vehicle body. The supporting frame is provided with: a frame main body which has a side edge part extending along one side surface of the power control unit in a front-rear direction of the vehicle, and a rear edge part extending from a rear end part of the side edge part along a rear surface of the power control unit, in a widthwise direction of the vehicle, and which is of an L shape when viewed from above; a front connection part which connects a front end part of the side edge part of the frame main body with a front end frame member of the engine compartment; and a rear connection part which connects the rear edge part of the frame main body with a rear end frame member of the engine compartment. When seen in the side view, the side edge part is arranged being rear-downward-angled while the rear connection part is arranged being rear-upward angled, and the front connection part, when seen in the side view, extends front-downward from a position along an upper edge of the front end part to a position along an extended line of a lower edge of the front end part. When the supporting frame receives a load input from the front of the vehicle, the front connection part deforms before the side edge part, the rear connection part, and the rear end frame member, it presses the frame main body and the power control unit diagonally rear-downward, and this pressing causes the rear connection part to rotationally displace, to thereby displace the supporting frame and the power control unit diagonally rear-downward.

Advantageous Effects of Invention

According to the aspect of (1) above, by installing the front connection part so that at the time of a frontal collision of the vehicle, the frame main body and the power control unit are pressed diagonally rear-downward along the side edge part of the frame main body by the collision load thereof, and by rotationally displacing the rear connection part so that pressing of the frame main body causes the rear edge part thereof to be displaced diagonally rear-downward, upward displacement of the power control unit is suppressed to thereby facilitate maintenance of wire connection with the electric motor in the engine compartment, and even with a configuration in which the upper part of the rear end frame member projects forward (in the engine compartment), the power control unit is unlikely to come in contact with this portion. Thereby, it is possible to simplify the wire connection and reduce load input to the power control unit to optimize the design thereof, thereby reducing the weight of the driving unit. Moreover, by arranging the side edge part and the rear edge part of the frame main body along one side surface and the rear surface of the power control unit, disturbance from the side and the rear to the power control unit can be suppressed.

DESCRIPTION OF EMBODIMENTS

Figure 1:
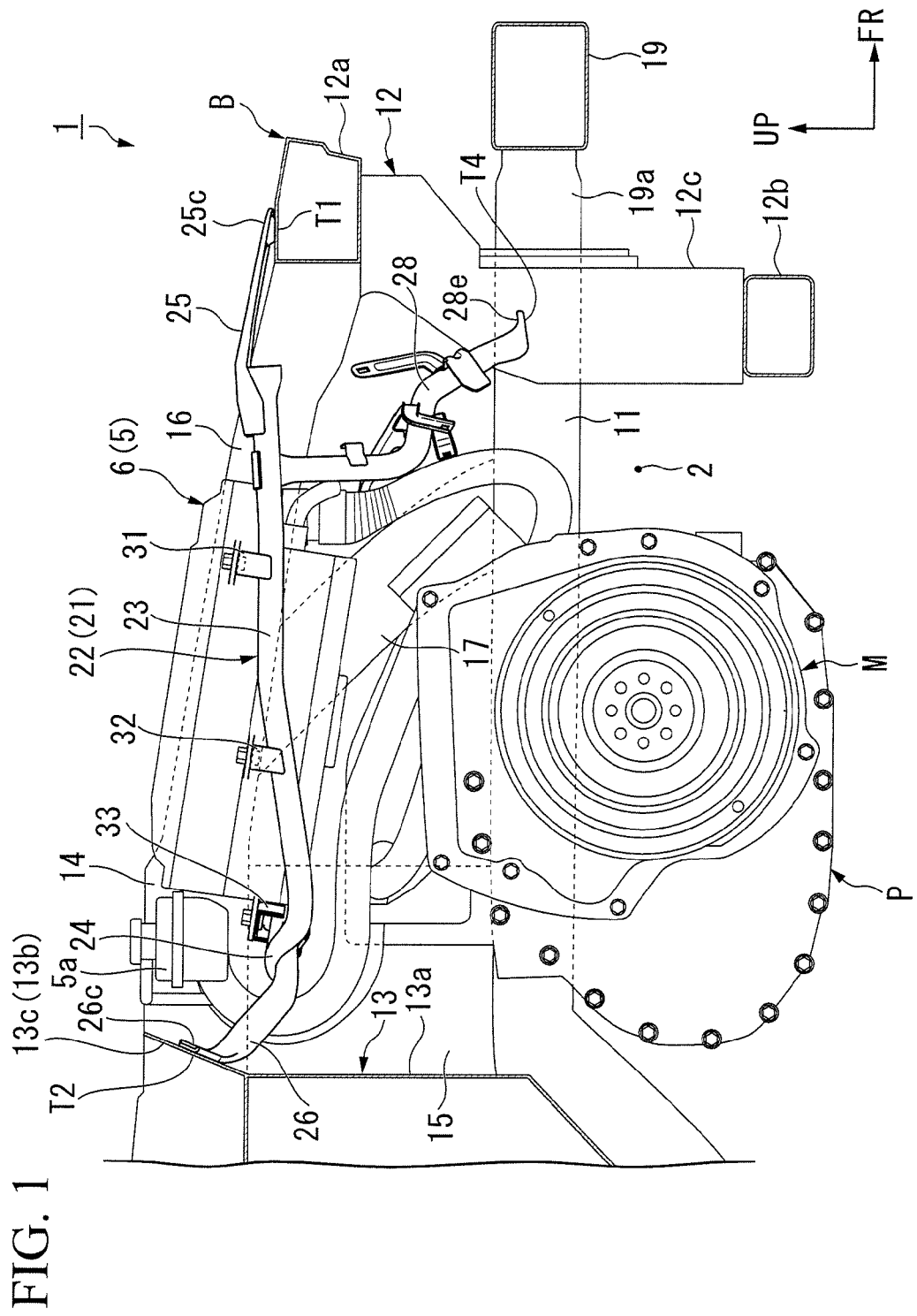
FIG. 1 is a side view of a left side vehicle body front part of a hybrid vehicle in an embodiment according to the present invention.

Hereunder, an embodiment according to the present invention is described, with reference to the drawings. In the following description, the front-rear orientation and the left-right orientation are the same as the orientations in the vehicle described below unless otherwise stated. In appropriate locations in the drawings used in the following description, arrow FR denotes the vehicle front side, arrow LH denotes the vehicle left side, and arrow UP denotes the vehicle upper side.

Figure 2:
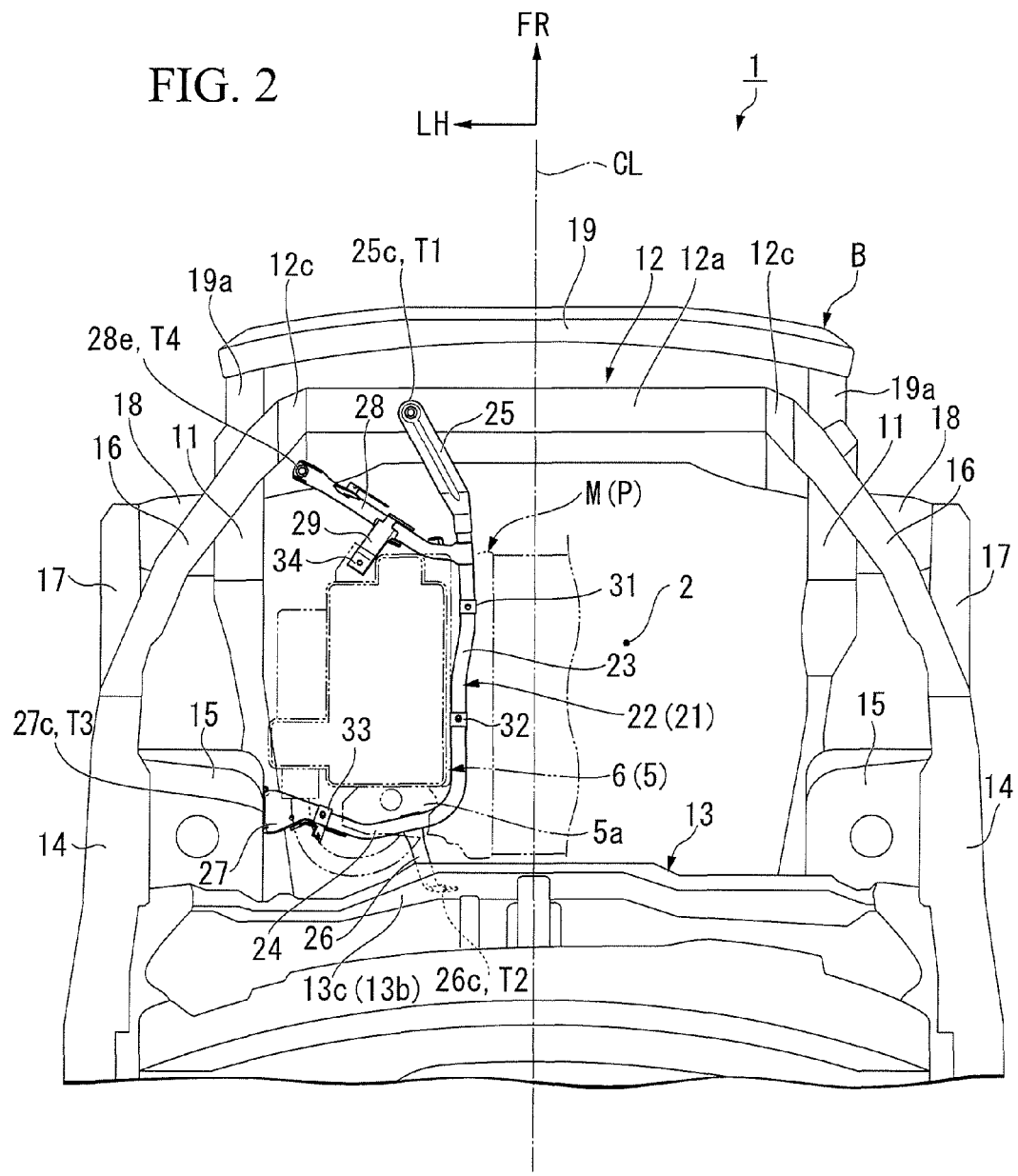
FIG. 2 is a top view of the vehicle body front part of the same hybrid vehicle.

FIG. 1 and FIG. 2 show the front part of a vehicle body B of a hybrid vehicle (vehicle) 1. The hybrid vehicle 1 is provided with an engine (internal combustion engine), a power unit P including a generator and a motor (electric motor) M, a high voltage system battery which is charged with generated output of the generator, and a power control unit (hereunder, referred to as PCU) 5 which controls the operation of the generator and the motor M. The generator is driven by mechanical output of the engine. The motor M uses at least one of discharge output of the battery and generator output of the generator, to drive driving wheels. The power unit P and the PCU 5 are accommodated in an engine compartment 2 at the front part of the vehicle body B. For convenience of illustration, the engine, the generator, the battery, and the driving wheels are omitted in the figures.

The vehicle body B is of a monocoque structure, in which panel components and framework components are integrally joined by means of welding or the like, and it has: a pair of left and right front side frames 11 that extend in the front-rear direction in the lower part of the engine compartment 2; a bulkhead 12 which spans between the front end parts of the left and right front side frames 11; a dashboard 13 which spans between the rear end parts of the left and right front side frames 11 and which separates the engine compartment 2 from a passenger compartment; a pair of left and right front members 14 which extend in the front-rear direction above the left and right front side frames 11 and on the vehicle widthwise outer side, and the rear end parts of which connect to the dashboard 13; a pair of left and right damper housings (outer frame members) 15 which span and are joined between the rear parts of the left and right front members 14, the rear parts of the left and right front side frames 11, and the left and right side parts of the dashboard 13; a pair of left and right bulkhead upper side frames 16 which extend forward and diagonally to the vehicle widthwise inner side from the front end parts of the left and right front members 14, and which connect to both of the upper left and right sides of the bulkhead 12; a pair of left and right wheel housing lower extensions 17 which extend forward and diagonally downward similarly from the front end parts of the left and right front members 14; and a pair of left and right front side gussets 18 which connect the front end part inner side of the left and right wheel housing lower extensions 17 and the front end part outer side of the left and right front side frames 11.

The dashboard 13 has: a flat plate-shaped dashboard lower 13a arranged orthogonal to the front-rear direction; and a dashboard upper (rear end frame member) 13b which forms an upper wall part 13c that extends at an angle from the upper edge of the dashboard lower 13a so as to be positioned on the front side with approach to the upper side. The upper wall part 13c of the dashboard upper 13b is provided so as to project forward of the dashboard lower 13a (to the engine compartment 2 side).

The bulkhead 12 has a bulkhead upper frame (front end frame member) 12a and a bulkhead lower cross member 12b which are arranged thereabove and therebelow and which extend to the left and right, and a pair of left and right bulkhead side stays 12c which extend upward and downward so as to connect between the left end parts and between the right end parts of these bulkhead upper frame 12a and the bulkhead lower cross member 12b. In front of the left and right bulkhead side stays 12c, there are projecting a pair of left and right bumper beam stays 19a which continue to the left and right front side frames 11 so as to extend them, and the left and right end parts of the bumper beam 19 are respectively fixed on the front end parts of these left and right bumper beam stays 19a.

The PCU 5 is such that a power module having a converter circuit and an inverter circuit, a capacitor, a reactor, a gate drive circuit board (GDCB), a controller device (ECU), and so forth are accommodated in a casing 6. The PCU 5 raises the direct current voltage supplied from the battery and then converts it into alternating current voltage, and it supplies this voltage to the motor M to drive it. Further, it converts the voltage at the time when the motor M is operated to regenerate, into direct current voltage and lowers the voltage to be supplied to the battery. The PCU 5 converts the voltage generated by the generator into direct current voltage and lowers the voltage to be supplied to the battery, or it supplies the voltage generated by the generator to the motor M to drive it.

Figure 3:
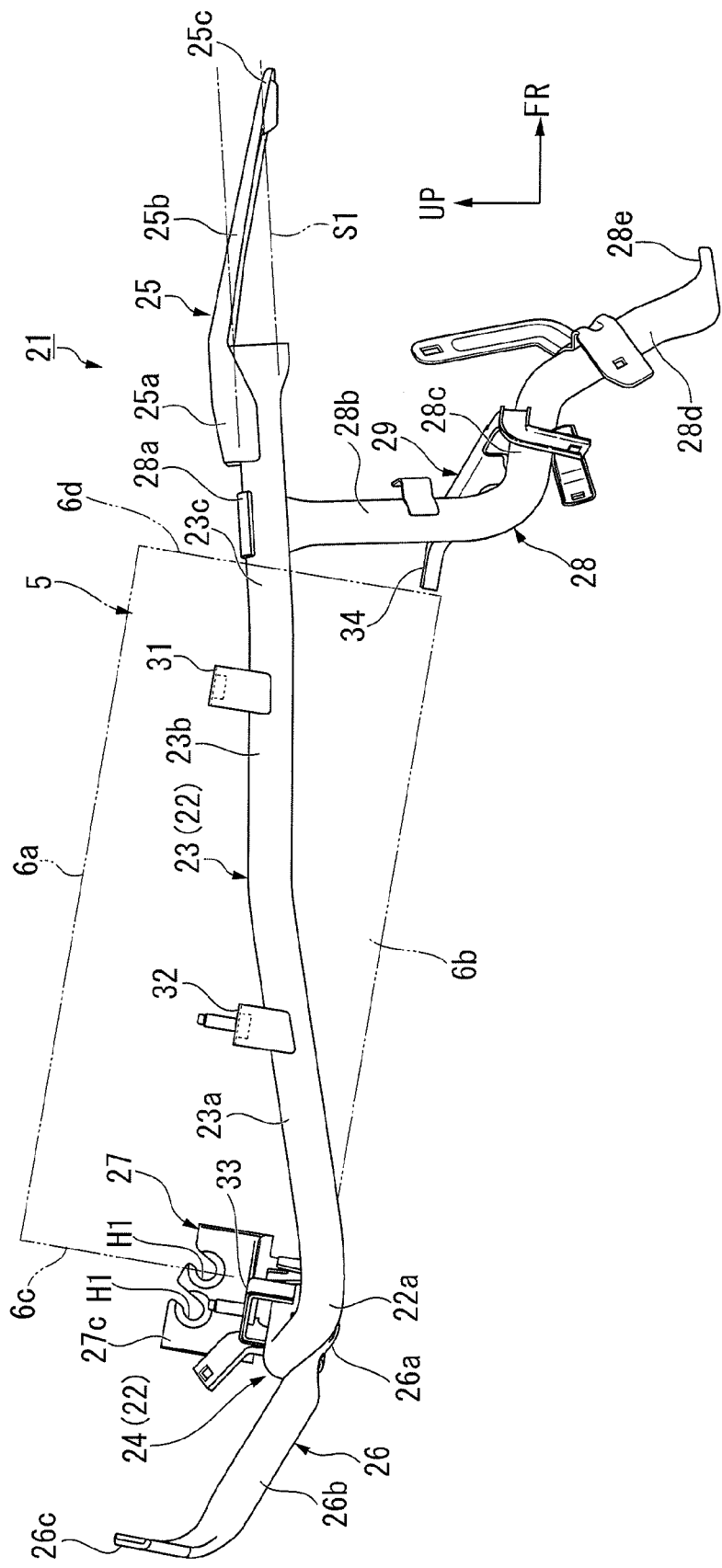
FIG. 3 is a side view of a left side PCU supporting frame of the same hybrid vehicle.

Making reference also to FIG. 3, the PCU 5 is such that an upper surface 6a of the substantially rectangular solid shaped casing 6 is arranged along the upper edges of the front member 14 and the bulkhead upper side frame 16, which are arranged front-downward when viewed from the side. The PCU 5 is a water cooled type in which cooling water is circulated within the casing 6. A cooling water tank 5a is arranged at the upper side of a rear face 6c of the casing 6 so as to be adjacent thereto.

A power unit P is supported on the vehicle body B at the center within the engine compartment 2 via a mount (not shown in the figure). Meanwhile, the PCU 5 is arranged above the power unit P within the engine compartment 2, and is supported on the vehicle body B via a supporting frame 21.

Figure 4:
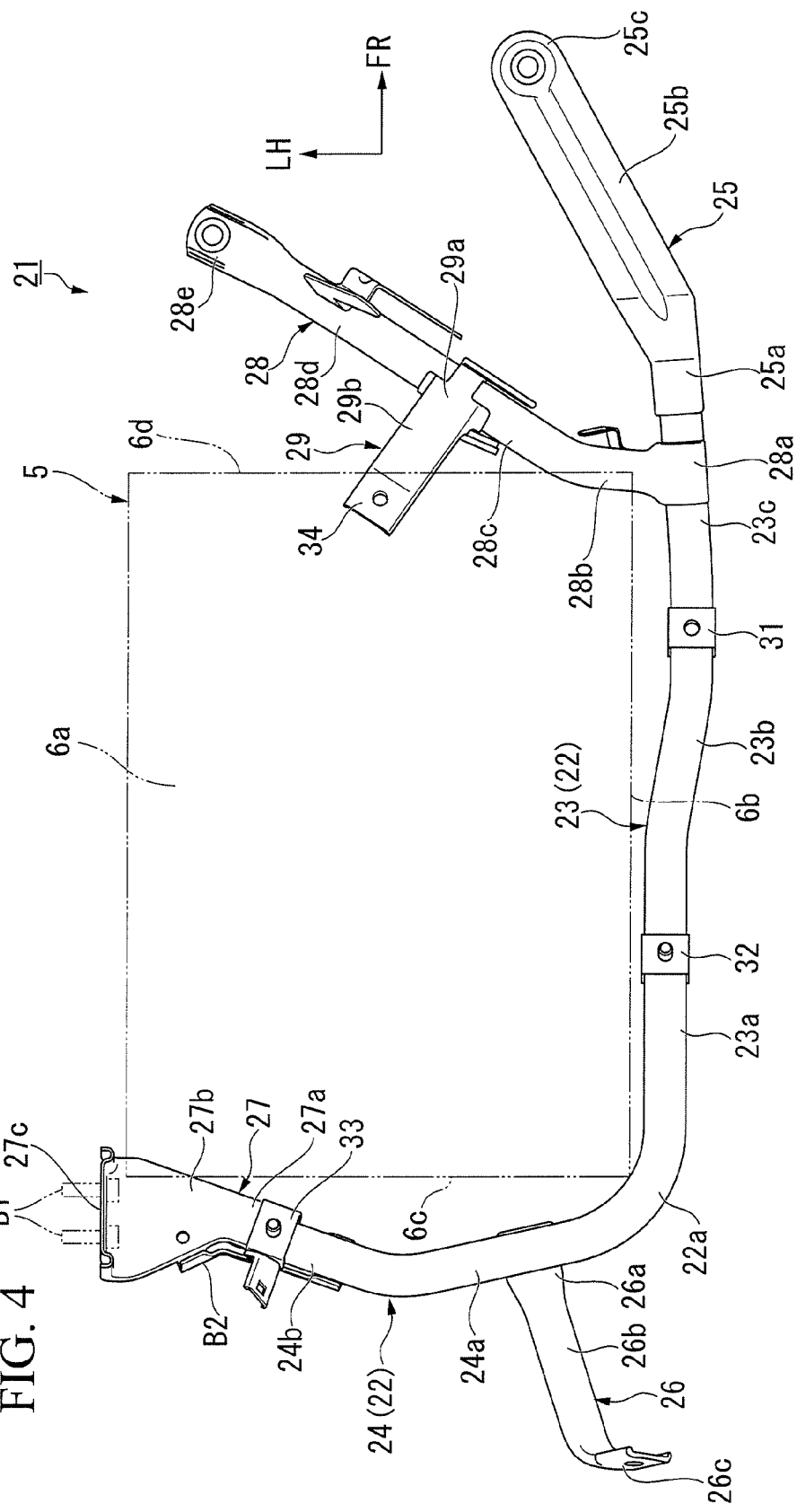
FIG. 4 is a top view of the same supporting frame.
Figure 5:
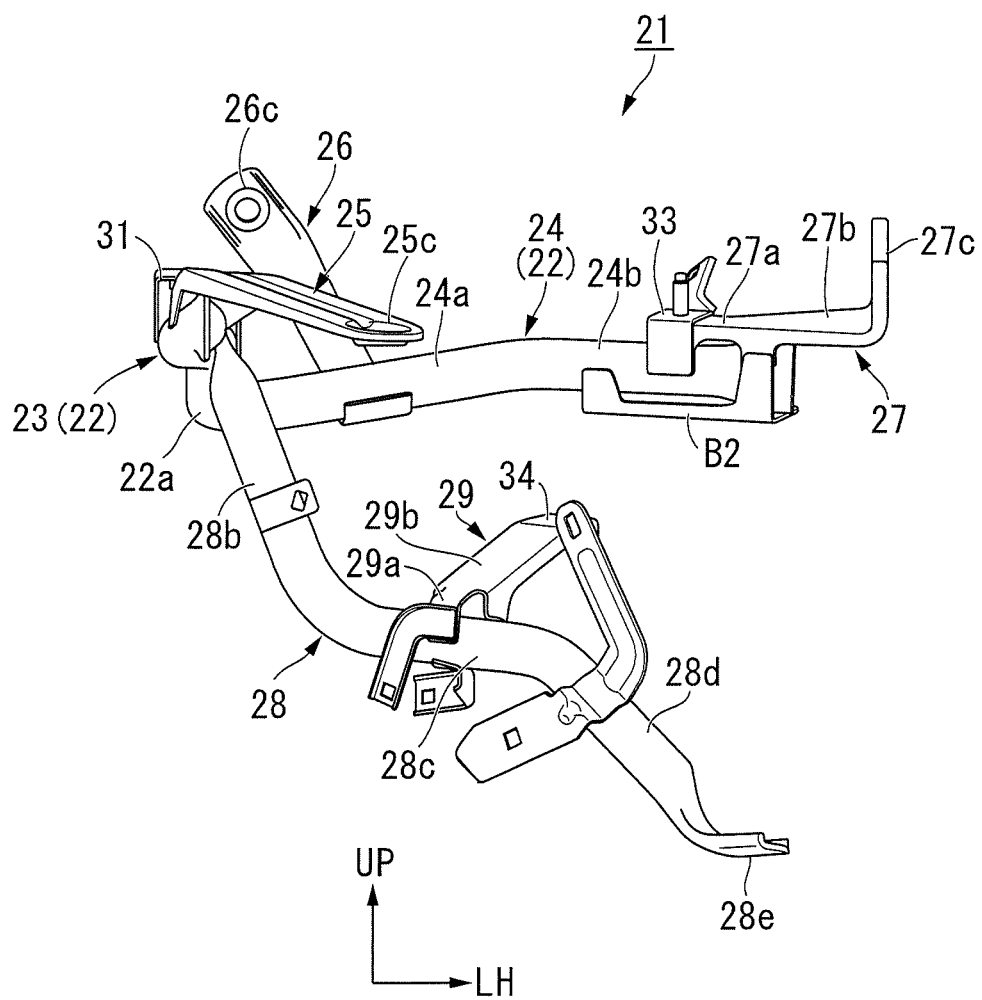
FIG. 5 is a front view of the same supporting frame.
Figure 6:
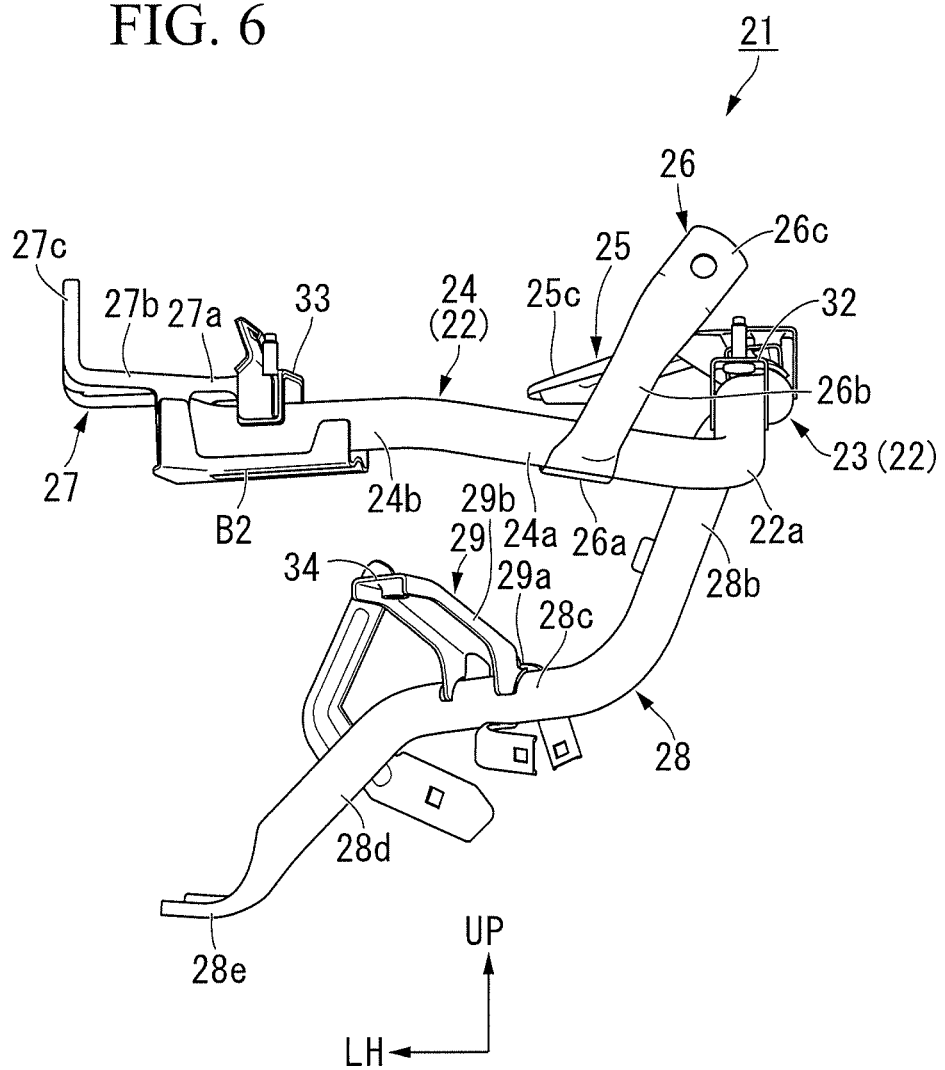
FIG. 6 is a rear view of the same supporting frame.

Making reference also to FIG. 4, the supporting frame 21 is composed of several types of steel materials integrally joined by means of welding. It has: a frame main body 22 in a L shape when viewed from thereabove, which has an inner side edge part (side edge part) 23 and a rear edge part 24 arranged along the inner side surface (one side surface) 6b and the rear surface 6c of the PCU 5 (casing 6); a front supporting bracket (front connection part) 25 which extends forward from the front end part of the inner side edge part 23 of the frame main body 22 to a first fastening part T1 provided on the bulkhead upper frame 12a; a rear supporting bracket (rear connection part) 26 which extends backward from the rear edge part 24 of the frame main body 22 to a second fastening part T2 provided on the upper wall part 13c of the dashboard upper 13b; an outer supporting bracket (outer connection part) 27 which extends outward from the outer end part of the rear edge part 24 of the frame main body 22 to a third fastening part T3 provided on the damper housing 15; and a front-bottom supporting pipe 28 which extends front-downward and outward in a stepped manner from the front end part of the inner side edge part 23 of the frame main body 22 to a fourth fastening part T4 provided on the bulkhead side stay 12c.

On the upper surface side of the inner side edge part 23 of the frame main body 22, there are provided a pair of front and rear inner side fastening parts 31 and 32 which are capable of fastening a pair of front and rear to be fastened parts provided on the inner side surface 6b of the PCU 5. On the upper surface side of the outer end part of the rear edge part 24, there is provided a rear fastening part 33 which is capable of fastening a to be fastened part provided on the rear surface 6c of the PCU 5. To the intermediate part of the front-bottom supporting pipe 28, there is joined the front end part of the front-bottom supporting bracket 29, which diagonally extends backward and outward, and on the rear end part of this front-bottom supporting bracket 29, there is provided a front-bottom fastening part 34 capable of fastening a to be fastened part that is provided on the front surface 6d of the PCU 5.

With these fastening parts 31 through 34 at four locations, the PCU 5 is fastened and fixed on the supporting frame 21.

The PCU 5 is arranged deviated from the left-right center of the vehicle body (shown with the straight line CL in FIG. 2) to one side (left side), and when viewed from thereabove, it is arranged so as to be surrounded on three sides by the inner side edge part 23 and the rear edge part 24 of the frame main body 22 of the supporting frame 21, and the front-bottom supporting pipe 28 of the supporting frame 21.

The inner side surface 6b of the PCU 5 is adjacent to the outer side of the inner side edge part 23 of the frame main body 22, the front surface 6d of the PCU 5 is adjacent to the rear of the front-bottom supporting pipe 28, and the rear surface 6c of the PCU 5 is adjacent to the front of the rear edge part 24 of the frame main body 22. As a result, disturbance from the front side, the inner side, and the rear side to the PCU 5 are suppressed.

Making reference to FIG. 3 through FIG. 6, the frame main body 22 is composed of a round steel pipe, and it is arranged so that the inner side edge part 23 is angled front-upward (rear-downward), with respect to the PCU 5 arranged angled front-downward.

The inner side edge part 23 is of a linear shape that overall extends front-upward from the front end of a bent part 22a between the rear edge part 24 and itself toward the front side.

In detail, the inner side edge part 23 has: a first linear part 23a which extends at a front-upward angle from the front end of the bent part 22a when viewed from the side while extending along the front-rear direction when viewed from above; a second linear part 23b which extends at a gentler angle when viewed from the side, from the front end of the first linear part 23a while extending at an angle toward the inner side when viewed from above; and a third linear part 23c which extends from the front end of the second linear part 23b at an angle equivalent to that of the second linear part 23b when viewed from the side while extending along the front-rear direction when viewed from above.

The rear edge part 24 extends outward from the outer side end of the bent part 22a, overall in the shape of a V with a shallow backward convex when viewed from above.

In detail, the rear edge part 24 has: a fourth linear part 24a which extends at a backward angle from the outer side end of the bent part 22a while extending slightly at an upward angle when viewed on the front-rear plane; and a fifth linear part 24b which extends at a forward angle when viewed from above, from the outer end of the fourth linear part 24a while extending slightly at a downward angle when viewed on the front-rear plane.

The front supporting bracket 25 is a press-molded steel plate product, and it has: a base end part (rear end part) 25a which is welded and fixed on the front end part of the inner side edge part 23 in a state of being fitted from above; a flat plate-shaped extension piece 25b which extends at a front-downward angle when viewed from the side, from the base end part 25a toward the front side while extending at an outward angle when viewed from above; and a front end fastening part 25c which is formed at the tip end part (front end part) of the extension piece 25b.

The front end fastening part 25c is fastened and fixed on the first fastening part T1 of the bulkhead upper frame 12a. The extension piece 25b extends front-downward from a position offset upward from the axial center of the third linear part 23c of the inner side edge part 23 when viewed from the side. The front end fastening part 25c is arranged at a position along the extension line S1 (refer to FIG. 3) of the lower edge of the third linear part 23c when viewed from the side. That is to say, the front supporting bracket 25 extends front-downward to the front side toward the position along the extension line S1 of the front end part, from the position along the upper edge of the front end part (third linear part 23c) of the inner side edge part 23 when viewed from the side.

The rear supporting bracket 26 is composed of a round steel pipe, and it has: a welding fixation part 26a which is formed, by crushing the front end part thereof, in an arc shape that aligns with the lower outer surface of the rear edge part 24 (fourth linear part 24a); a pipe-shaped extension part 26b which extends at a rear-upward angle when viewed from the side from the welding fixation part 26a while extending at an inward angle when viewed from above; and a flat plate-shaped rear end fastening part 26c, in which the tip end part (rear end part) of the extension part 26b is crushed, and which rises upward and inward.

The rear end fastening part 26c is fastened and fixed on the second fastening part T2 of the front-leaning upper wall part 13c in the dashboard upper 13b.

The outer supporting bracket 27 is a press-molded steel plate product, and it has: a base end part (inner end part) 27a which is welded and fixed on the outer end part of the rear edge part 24 in a state of being fitted from above; a flat plate-shaped extension part 27b which extends outward from the base end part 27a so as to increase the font-rear direction width when viewed from above; and a flat plate-shaped outer fastening part (fastening part) 27c which rises upward from the outer end edge of the extension part 27b.

The outer fastening part 27c is fixed on the third fastening part T3 of the damper housing 15 by a pair of front and rear fastening bolts B1. Each bolt insertion hole (insertion hole) H1 of the outer fastening part 27c opens diagonally front-upward when viewed from the side. To the bottom surface side of the fifth linear part 24b of the rear edge part 24, there is joined a supporting bracket B2 which supports the extension part 27b of the outer supporting bracket 27.

The front-bottom supporting pipe 28 is composed of a round steel pipe, and it extends front-downward and outward from the front end part of the inner side edge part 23 while being bent in a stepped manner.

In detail, the front-bottom supporting pipe 28 has: a welding fixation part 28a, in which the inner end part thereof is crushed, and which is formed in an arc shape that aligns with the upper outer surface of the front end part of the inner side edge part 23; a sixth linear part 28b which extends at a downward and outward angle from the welding fixation part 28a; a seventh linear part 28c which extends at a forward and outward angle from the lower end part of the sixth linear part 28b; an eighth linear part 28d which extends at a front-downward and outward angle from the outer end part of the seventh linear part 28c; and a flat plate-shaped front-outer fastening part 28e in which the tip end part (lower end part) of the eighth linear part 28d is crushed and which rises forward and outward.

The front-outer fastening part 28e is fastened and fixed on the fourth fastening part T4 of the bulkhead side stay 12c.

The front-bottom supporting bracket 29 is a press-molded steel plate product, and it has: a base end part (front end part) 29a which is welded and fixed on the seventh linear part 28c of the front-bottom frame in a state of being fitted from above; a flat plate-shaped extension piece 29b which extends at a rear-upward and outward angle from the base end part 29a; and the front-bottom fastening part 34 that is provided on the tip end part of the extension piece 29b.

The PCU 5 is supported only by the frame main body 22 and the front-bottom supporting pipe 28 (front-bottom supporting bracket 29), and it is directly supported by the respective supporting brackets 25, 26, and 27.

Here, the strength of the front supporting bracket 25, for example, with respect to deformation such as buckling, is lower than that of the frame main body 22 and the rear supporting bracket 26, and it is lower than the strength with respect to deformation such as crushing of the periphery of the second fastening part T2 of the dashboard upper 13b.

Figure 7:
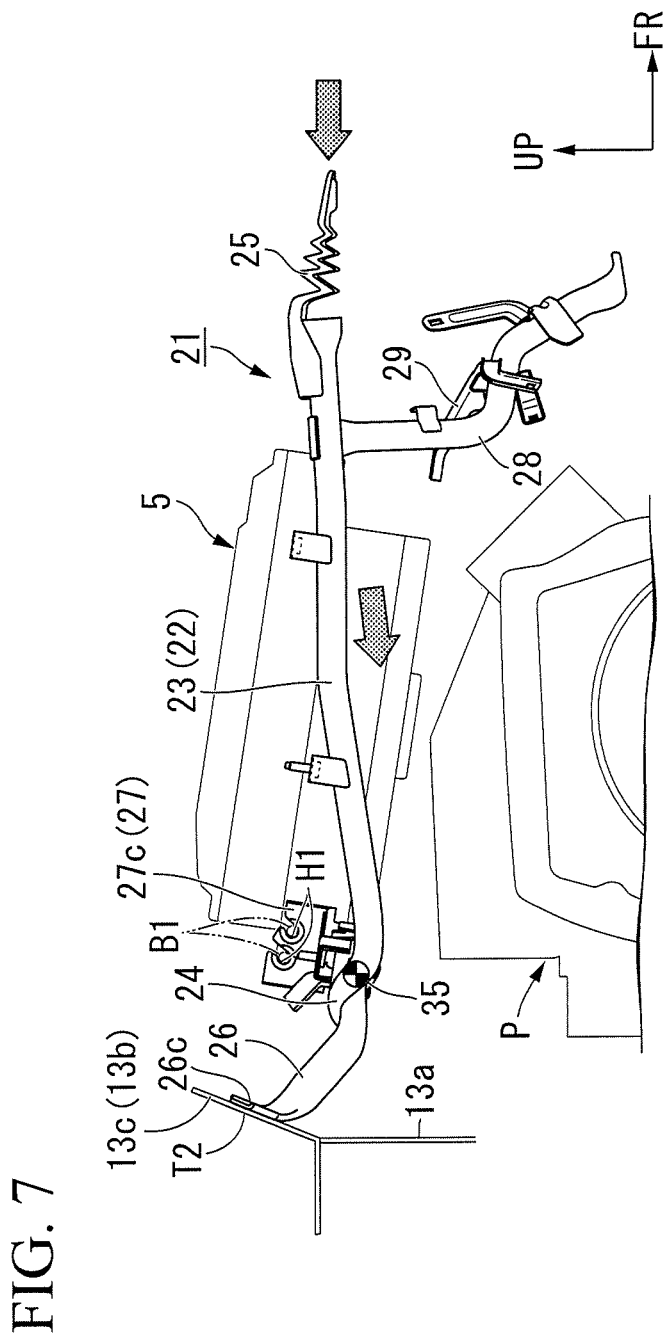
FIG. 7 is an action explanatory diagram of the same PCU supporting structure, being a side view of the left side PCU supporting structure showing a state immediately after a frontal collision.

Therefore, when an excessive load input is received on the front supporting bracket 25 from the front side at the time of a frontal collision of the hybrid vehicle 1, first, a deformation such as buckling occurs to the front supporting bracket 25 as shown in FIG. 7. The input of the above load is received on the inner side edge part 23 of the frame main body 22 along the axial direction thereof due to an optimized offset amount and arrangement of the front supporting bracket 25, and consequently, the frame main body 22 is pressed diagonally down-backward along the angle of the inner side edge part 23 when viewed from the side.

Figure 8:
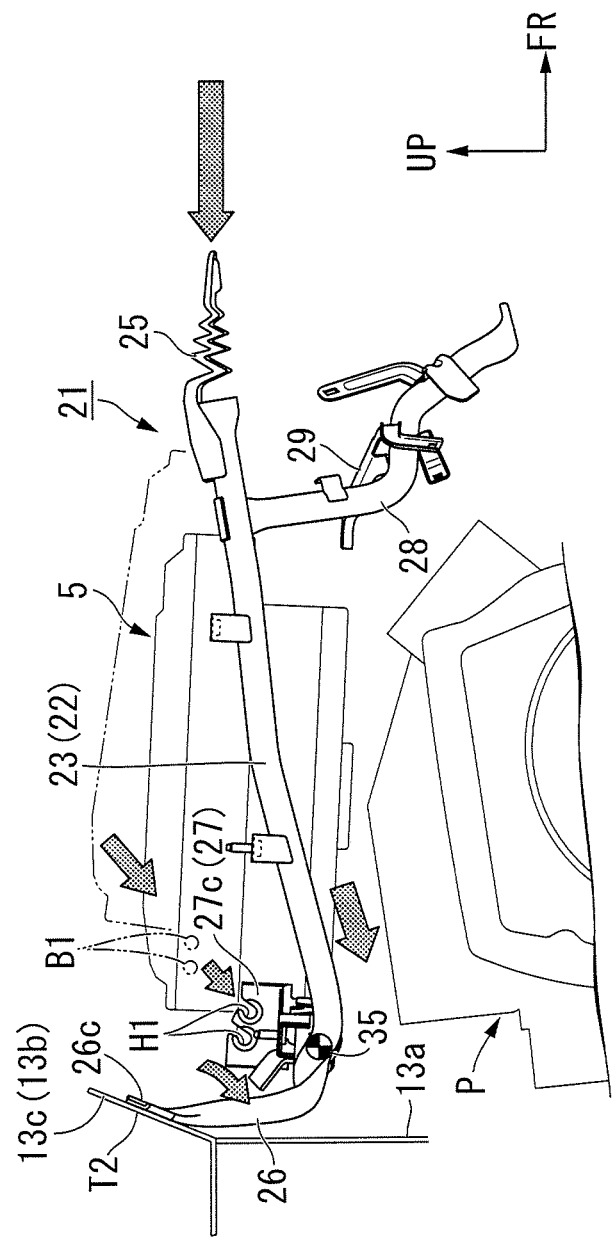
FIG. 8 is an action explanatory diagram of the same PCU supporting structure, being a side view of the left side showing a state where a rear supporting bracket has been rotationally-displaced after a frontal collision.

Moreover, since the frame main body 22 and the rear supporting bracket 26 are arranged in a V shape with a downward convex in the side view of the supporting frame 21, when the frame main body 22 is strongly pressed diagonally down-backward, as shown in FIG. 8, the frame main body 22 (rear edge part 24) and the rear supporting bracket 26 are relatively displaced so as to bend about the connection point 35 therebetween.

At this time, the rear supporting bracket 26 is rotationally displaced so as to draw in the front end part (rear edge part 24) downward about the rear end part.

Furthermore, at this time, since the bolt insertion holes H1 of the outer supporting bracket 27 open diagonally up-forward, when a large diagonally down-backward load is applied to the frame main body 22, the outer supporting bracket 27 is separated from the bolts B1 that are fastened to the third fastening part T3 of the damper housing 15, allowing the frame main body 22 to move diagonally down-backward.

With the PCU 5 being displaced diagonally down-backward together with this frame main body 22, upward displacement of the PCU 5 is suppressed, and the wire connection with the power unit P is maintained.

Moreover, the upper wall part 13c which projects forward in the dashboard upper 13b, is positioned on the rear side of the PCU 5 at the pre-collision mount position. However, with the PDU 5 being displaced diagonally down-backward as described above at the time of a frontal collision load input, contact between the PCU 5 and the upper wall part 13c is avoided and the load input with respect to the PCU 5 is reduced.

The front supporting bracket 25, the rear supporting bracket 26, the outer supporting bracket 27, and the front-bottom supporting pipe 28 that support the frame main body 22 and the PCU 5 respectively have plate thicknesses and sectional shapes that are different from each other, and the resonance frequencies are changed from each other. This is to prevent resonance with each member that is connected to the bulkhead 12, the damper housing 15, and the dashboard 13 in the vehicle body B which have different resonance frequencies, and suppress vibration of the PCU 5 to thereby suppress noise occurrence.

As described above, the supporting structure for a control unit of a vehicle in the above embodiment is to be applied to the hybrid vehicle 1 that is provided with, in the engine compartment 2 of the front part of the vehicle body B, the motor M serving as a power source, the PCU 5 that controls driving of the motor M, and the supporting frame 21 that supports the PCU 5 on the vehicle body B. In the supporting structure, the supporting frame 21 is provided with: the frame main body 22 which has the inner side edge part 23 extending in the vehicle front-rear direction along the inner side surface 6b of the PCU 5 on the vehicle widthwise inner side, and the rear edge part 24 extending in the vehicle widthwise direction from the rear end part of the inner side edge part 23 along the rear surface 6c of the PCU 5, and which is of an L shape when viewed from above; the front supporting bracket 25 which connects the front end part of the inner side edge part 23 of the frame main body 22 to the bulkhead upper frame 12a serving as a front end frame member of the engine compartment 2; and the rear supporting bracket 26 which connects the rear edge part 24 of the frame main body 22 to the dashboard upper 13b serving as a rear end frame member of the engine compartment 2. When viewed along the front-rear direction of the vehicle, the inner side edge part 23 is arranged at a rear-downward angle, and the rear supporting bracket 26 is arranged at a rear-upward angle. The front supporting bracket 25 extends from the position along the upper edge of the front end part of the inner side edge part 23 when viewed from the side, to the position along the extension line S1 of the lower edge of the front end part. When a load input is received on the supporting frame 21 from the front side of the vehicle, the front supporting bracket 25 is deformed before the inner side edge part 23, the rear supporting bracket 26, and the dashboard upper 13b, diagonally pressing down-backward the frame main body 22 and the PCU 5, and the rear supporting bracket 26 is rotationally displaced by this pressing, thereby causing the supporting frame 21 and the PCU 5 to be displaced diagonally down-backward.

According to this configuration, by installing the front supporting bracket 25 so that at the time of a frontal collision of the vehicle, the frame main body 22 and the PCU 5 are pressed diagonally rear-downward along the inner side edge part 23 of the frame main body 22 by the collision load thereof, and by rotationally displacing the rear supporting bracket 26 so that pressing of the frame main body 22 causes the rear edge part 24 thereof to be displaced diagonally rear-downward, upward displacement of the PCU 5 is suppressed to thereby facilitate maintenance of the wire connection with the motor M in the engine compartment 2, and even with a configuration in which the upper wall part 13c of the dashboard upper 13b projects forward (in the engine compartment 2), the PCU 5 is unlikely to come in contact with this portion. Thereby, it is possible to simplify the wire connection and reduce load input to the PCU 5 to optimize the design thereof, thereby reducing the weight of the driving unit. Moreover, by arranging the inner side edge part 23 and the rear edge part 24 of the frame main body 22 along the inner side surface 6b and the rear surface 6c of the PCU 5, disturbance from the side and rear to the PCU 5 can be suppressed.

Furthermore, the above supporting structure for a control unit of a vehicle is of a configuration such that the PCU 5 is arranged at a position deviated to one side from the vehicle widthwise center of the engine compartment 2, the inner side edge part 23 is arranged along the inner side surface 6b that faces the vehicle widthwise inner side of the PCU 5, and the rear edge part 24 is provided so as to extend from the rear end part of the inner side edge part 23 toward the vehicle widthwise outer side. Moreover there is further provided the outer supporting bracket 27 which connects the vehicle widthwise outer end part of the rear edge part 24 to the damper housing 15 serving as the outer frame member of the engine compartment 2. Also, the outer supporting bracket 27 has the plate-shaped outer fastening part 27c that is arranged orthogonal to the vehicle widthwise direction, and this outer fastening part 27c forms the bolt insertion holes 141 for the fastening bolts B1 with respect to the damper housing 15, the bolt insertion holes H1 being opened diagonally up-forward. That is to say, in this outer fastening part 27c, there is formed the bolt insertion holes H1 that open diagonally up-forward, and the outer supporting bracket 27 and the damper housing 15 are connected via the fastening bolts B1 inserted in these bolt insertion holes H1.

According to this configuration, when a collision load input is received, the outer fastening part 27c of the outer supporting bracket 27 can be separated from the fastening position with the damper housing 15, and the periphery of the rear edge part 24 of the frame main body 22 can be easily displaced down-forward.

Moreover, the supporting structure for a control unit of a vehicle above is further provided with the front-bottom supporting pipe 28 which extends downward from the front end part of the inner side edge part 23 of the frame main body 22 to the outer side in the vehicle widthwise direction.

According to this configuration, the front end part of the frame main body 22 can be supported by the front-bottom supporting pipe 28 separately from the front supporting bracket 25, which has a comparatively low strength, and by arranging the front-bottom supporting pipe 28 along the front surface 6d of the PCU 5, disturbance from the front side can be suppressed.

Moreover, the supporting structure for a control unit of a vehicle above is such that the dashboard upper 13b has the upper wall part 13c which projects forward in the front-rear direction of the vehicle, the rear supporting bracket 26 is fixed on this upper wall part 13c, and the PCU 5 is arranged in front of the upper wall part 13c.

According to this configuration, it is possible to suppress the length of the rear supporting bracket 26 while enabling displacement so that the supporting frame 21 and the PCU 5 will be positioned under the upper wall part 13c which projects forward in the dashboard upper 13b, and it is thereby possible to reduce load input to the PCU 5.

The present invention is not limited to the above embodiment, and for example, in addition to a hybrid vehicle, it may also be applied to an electric vehicle or a fuel-cell electric vehicle, which travels only with a motor serving as a driving power source, as long as the vehicle is provided with, in the engine compartment at the front part of the vehicle body, a motor serving as a power source, a PCU that controls driving of the motor, and a supporting frame that supports the PCU on the vehicle body.

The configuration in the above embodiment is an example of the present invention, and various types of modifications may be made thereto without departing from the scope of the invention.

(2) In the above embodiment, the power control unit may be arranged at a position deviated away to one side from a vehicle widthwise center of the engine compartment; the side edge part may be arranged along an inner side surface that faces a vehicle widthwise inner side of the power control unit; the rear edge part may be provided so as to extend from the rear end part of the side edge part toward a vehicle widthwise outer side; and there may be further provided an outer connection part which connects an outer end part in the vehicle widthwise direction of the rear edge part with an outer frame member of the engine compartment. The outer connection part may have a plate-shaped fastening part that is arranged so as to be orthogonal to the vehicle widthwise direction, in the fastening part there may be formed an insertion hole that opens diagonally front-upward, and the outer connection part and the outer frame member may be connected via a fastening bolt inserted in the insertion hole.

(3) In the embodiment (2) above, there may be further provided a front-bottom supporting pipe which extends downward from the front end part of the side edge part of the frame main body toward the vehicle widthwise outer side.

(4) In any one of the above embodiments, the rear end frame member may have an upper wall part which projects forward in the front-rear direction, and the rear connection part may be fixed on the upper wall part while the power control unit may be arranged in front of the upper wall part.

In the case of (2) above, at the time of a collision load input, the fastening part of the outer connection part can be separated from the position of fastening with the outer frame member, and it is possible to facilitate the periphery of the rear edge part of the frame main body to be displaced diagonally front-downward.

In the case of (3) above, the front end part of the frame main body can be supported with the front-bottom supporting pipe separately from the front connection part, which is of a comparatively low strength, and by arranging the front-bottom supporting pipe along the front surface of the power control unit, disturbance from the front can be suppressed.

In the case of (4) above, by suppressing the length of the rear connection part and displacing the supporting frame and the power control unit so that they will be positioned under the upper wall part that projects forward in the rear end frame member, it is possible to reduce load input to the power control unit.

INDUSTRIAL APPLICABILITY

According to the present invention, it is possible to provide a supporting structure for a control unit of a vehicle in which load input at the time of a frontal collision is reduced in order to reduce the weight of the power control unit.

REFERENCE SIGNS LIST

1 Hybrid vehicle (vehicle)
2 Engine compartment
5 PCU (power control unit)
6b Inner side surface (one side surface)
6c Rear surface
12a Bulkhead upper frame (front end frame member)
13b Dashboard upper (rear end frame member)
13c Upper wall part
15 Damper housing (outer frame member)
21 Supporting frame
22 Frame main body
23 Inner side edge part
24 Rear edge part
25 Front supporting bracket (front connection part)
26 Rear supporting bracket (rear connection part)
27 Outer supporting bracket (outer connection part)
27c Outer fastening part (fastening part)
28 Front-bottom supporting pipe
B Vehicle body
M Motor (electric motor)

S1 Extension line
B1 Fastening bolt
H1 Bolt insertion hole (insertion hole)

The invention claimed is:

1. A supporting structure for a control unit of a vehicle that is provided with, in an engine compartment at a front part of a vehicle body:
   an electric motor serving as a power source;
   a power control unit that controls driving of said electric motor; and
   a supporting frame that supports said power control unit on said vehicle body, wherein
   said supporting frame is provided with:
   a frame main body which has a side edge part extending along one side surface of said power control unit in a front-rear direction of said vehicle, and a rear edge part extending from a rear end part of said side edge part along a rear surface of said power control unit, in a widthwise direction of said vehicle, and which is of an L shape when viewed from above;
   a front connection part which connects a front end part of said side edge part of said frame main body with a front end frame member of said engine compartment; and
   a rear connection part which connects said rear edge part of said frame main body with a rear end frame member of said engine compartment;
   when seen in a side view, said side edge part is arranged being rear-downward-angled while said rear connection part is arranged being rear-upward angled;
   said front connection part, when seen in the side view, extends front-downward from a position along an upper edge of said front end part to a position along an extended line of a lower edge of said front end part; and
   when said supporting frame receives a load input from the front of said vehicle, said front connection part deforms before said side edge part, said rear connection part, and said rear end frame member, it presses said frame main body and said power control unit diagonally rear-downward, and this pressing causes said rear connection part to rotationally displace, to thereby displace said supporting frame and said power control unit diagonally rear-downward.

2. A supporting structure for a control unit of a vehicle according to claim 1, wherein:
   said power control unit is arranged at a position deviated away to one side from a vehicle widthwise center of said engine compartment;
   said side edge part is arranged along an inner side surface that faces a vehicle widthwise inner side of said power control unit;
   said rear edge part is provided so as to extend from said rear end part of said side edge part toward a vehicle widthwise outer side;
   there is further provided an outer connection part which connects an outer end part in said vehicle widthwise direction of said rear edge part with an outer frame member of said engine compartment;
   said outer connection part has a plate-shaped fastening part that is arranged so as to be orthogonal to said vehicle widthwise direction;
   in said fastening part there is formed an insertion hole that opens diagonally front-upward; and
   said outer connection part and said outer frame member are connected via a fastening bolt inserted in said insertion hole.

3. A supporting structure for a control unit of a vehicle according to claim 2, wherein
   there is further provided a front-bottom supporting pipe which extends downward from said front end part of said side edge part of said frame main body to the outer side in the vehicle widthwise direction.

4. A supporting structure for a control unit of a vehicle according to claim 1, wherein:
   said rear end frame member has an upper wall part which projects forward in the front-rear direction; and
   said rear connection part is fixed on said upper wall part while said power control unit is arranged in front of said upper wall part.

* * * * *